(12) United States Patent
Steiner (10) Patent No.: US 10,178,666 B2
(45) Date of Patent: Jan. 8, 2019

(54) METHOD AND COMPUTER NETWORK FOR TRANSMITTING MESSAGES

(71) Applicant: FTS Computertechnik GmbH, Vienna (AT)

(72) Inventor: Wilfried Steiner, Vienna (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 87 days.

(21) Appl. No.: 15/120,760

(22) PCT Filed: Feb. 20, 2015

(86) PCT No.: PCT/AT2015/050047
§ 371 (c)(1),
(2) Date: Aug. 23, 2016

(87) PCT Pub. No.: WO2015/123712
PCT Pub. Date: Aug. 27, 2015

(65) Prior Publication Data
US 2016/0366686 A1 Dec. 15, 2016

(30) Foreign Application Priority Data

Feb. 24, 2014 (AT) .............................. A 50138/2014

(51) Int. Cl.
*H04W 72/04* (2009.01)
*H04L 12/417* (2006.01)
*H04L 12/44* (2006.01)

(52) U.S. Cl.
CPC ....... *H04W 72/0446* (2013.01); *H04L 12/417* (2013.01); *H04L 12/44* (2013.01)

(58) Field of Classification Search
CPC ...... H04J 3/0658; H04L 12/417; H04L 12/44; H04L 12/40; H04L 12/40169; H04W 72/0446
See application file for complete search history.

(56) References Cited

U.S. PATENT DOCUMENTS 7,839,868 B2  11/2010 Kopetz
8,271,984 B2   9/2012 Stolpe
(Continued)

OTHER PUBLICATIONS

Austrian Search Report for AT Application No. A 50138/2014 dated Jan. 16, 2015 (1 page ).
(Continued)

*Primary Examiner* — Mewale A Ambaye
(74) *Attorney, Agent, or Firm* — Eversheds Sutherland (US) LLP (57) ABSTRACT

The invention relates to a method for transmitting messages in a computer network of a real-time system comprising components in the form of computing nodes and star couplets. A first group of components sends, relays or receives time-controlled messages according to a communication schedule, and a second group of components does not communicate according to a communication schedule. For example, the computing node 104 does not execute a communication schedule, i.e. the computing node 104 does not send time-controlled messages. Instead, the computing node 104 reacts to receiving a message 1-201*a* by sending a message 1-104*a* in response. According to the invention, the message 1-201*a* is sent in a time-controlled manner, for example by a star coupler 201. The computing node 104 receives the message 1-201*a* at time 17-104*a* and reacts to receiving the message 1-201*a* by sending the message 1-104*a* at time 17-104*b* to the star coupler 201. The star coupler 201 receives the message 1-104*a* at time 14-201*b*. Preferably an upper limit OBS of the maximum time interval between the receiving time 17-104*a* and the sending time 17-104*b* is determined in the computing node 104. In this way, the star coupler 201 can schedule the relaying time 14-201*c*, at which the message 1-104*a* is relayed in the network, as a time-controlled time. Alternatively, the com-
(Continued)

puting node 104 reacts by reading a current value from a local sensor, by altering the state of an actuator.

18 Claims, 9 Drawing Sheets

(56) References Cited

U.S. PATENT DOCUMENTS

| | | |
|---|---|---|
| 8,503,484 B2 | 8/2013 | Bonk et al. |
| 9,356,800 B2 | 5/2016 | Kopetz et al. |
| 2010/0281130 A1* | 11/2010 | Kopetz ............. H04L 12/40026 709/207 |
| 2011/0235648 A1* | 9/2011 | Ando .................... H04J 3/0652 370/401 |
| 2011/0296065 A1* | 12/2011 | Daecke ............... G06F 13/4291 710/61 |
| 2013/0215905 A1* | 8/2013 | Driscoll ............ H04L 12/40136 370/445 |
| 2015/0120803 A1 | 4/2015 | Angelow et al. |
| 2016/0211987 A1 | 7/2016 | Fidi |

OTHER PUBLICATIONS

PCT International Search Report for PCT Application No. PCT/AT2015/050047 dated May 13, 2015 (3 pages).

Al-Nayeem et al., "Middleware Design for Physically-Asynchronous Logically-Synchronous (PALS) Systems," IEEE (10 pages).

\* cited by examiner

METHOD AND COMPUTER NETWORK FOR TRANSMITTING MESSAGES

The invention relates to a method for transmitting messages in a computer network, wherein the computer network comprises computing nodes, the computing nodes of which are connected with each other via at least one star coupler and/or at least one multi-hop network, wherein each computing node is connected via at least one communication link with the at least one star coupler and/or the at least one multi-hop network, and wherein the computing nodes exchange messages with one another and with the at least one star coupler and/or the at least one multi-hop network.

Furthermore, the invention relates to a computer network, specifically a real-time computer network for transmitting messages, wherein the computer network comprises computing nodes, the computing nodes of which are connected with each other via at least one star coupler and/or at least one multi-hop network, wherein each computing node is connected via at least one communication link with the at least one star coupler and/or the at least one multi-hop network, and wherein the computing nodes exchange messages with one another and with the at least one star coupler and/or the at least one multi-hop network.

The invention is in the field of computer networks, specifically in the field of distributed real-time systems, wherein such a computer network, specifically a real-time system, for example, can comprise the following types of active components: Computing nodes and star coupler. Computing nodes execute functions such as the measurement of properties of physical processes by means of suitable sensor technology (sensors), the calculation of control variables, or the activation of actuators, such as valves. Star couplers receive messages from computing nodes and/or other star couplers and forward the messages to computing nodes and/or star couplers. Star couplers are, for example, bridges, switches, and/or routers in a wired communication or access points in a wireless communication. Computing nodes are connected to other computing nodes and/or star couplers via wired or wireless, preferably bi-directional, connections (i.e. communication links). Furthermore, star couplers can also be connected together by wired or wireless, preferably bi-directional, connections.

The components of such a real-time system, i.e. the star coupler and computing nodes, communicate via messages, which are transmitted in accordance with one or more communication schedules. The messages may be at least partially time-controlled messages.

It is an object of the invention to cost-effectively achieve distributed and coordinated communication in such a computer network, specifically real-time system.

Alternatively or additionally, it is an object of the invention to cost-effectively facilitate distributed and coordinated calculations and/or control loops in such a computer network, specifically real-time system.

Such coordinated calculations may serve as the basis in the so-called "Physical Asynchronous Logically Synchronous (PALS)" calculation model for example. Here calculations are divided into different computing nodes in rounds that are started and stopped in a time-synchronized manner. Such a calculation model is useful when implementing fault-tolerant systems: redundant calculations in different computing nodes are coordinated so that the management of redundancy is simplified. Such calculation models are used, for example, in the avionics industry.

Control loops are, for example, used for the automated controlling of temperature in a boiler in the chemical industry or in "x-by-wire" systems in the automotive and aerospace industries.

The specification of these applications is merely exemplary and is not intended to limit the scope of protection of the application.

This object is achieved with a method and computer network mentioned at the beginning by the fact that according to the invention:
- a first group of components is intended, wherein the components of the first group send and/or forward and/or receive time-controlled messages according to a communication schedule, wherein the first group comprises one, two or several component(s), and wherein each component of the first group is either a computing node, a star coupler or a star coupler of a multi-hop network, and wherein
- a second group of components is intended, wherein the components of the second group do not send and/or forward and/or receive time-controlled messages according to a communication schedule, wherein the second group comprises one, two or several component(s), and wherein each component of the first group is either a computing node, a star coupler or a star coupler of a multi-hop network,
- at least one component of the first group of components sends one, two or several time-controlled messages according to the communication schedule to one, two or several components of the second group of components, and wherein
- each of the computing nodes of the second group of components reacts in one of the following ways upon receipt of a time-controlled message, for example depending on the received message, specifically depending on the content of the received message:
  - Reading out a current value/values of one local sensor/ of two or more local /sensors;
  - Changing the state or the states of one or more local actors;
  - Executing an application-specific task;
  - Sending a new message,
and/or
- each of the star couplers of the second group of components reacts in one of the following ways upon receipt of a time-controlled message, for example depending on the received message, specifically depending on the content of the received message:
  - Sending a new message, or
  - Forwarding the received, time-controlled message, wherein the forwarding does not occur according to a communication schedule.

This object is achieved with a computer network mentioned at the beginning by the fact that according to the invention:
- a first group of components is intended, wherein the components of the first group are also set up to send and/or to forward and/or to receive time-controlled messages according to a communication schedule, wherein the first group comprises one, two or several component(s), and wherein each component of the first group is either a computing node, a star coupler or a star coupler of a multi-hop network, and wherein
- a second group of components is intended, wherein the components of the second group are not also set up to send and/or to forward and/or to receive time-controlled messages according to a communication schedule, wherein the second group comprises one, two or several component(s), and wherein each component of the first group is either a computing node, a star coupler or a star coupler of a multi-hop network, at least one component of the first group of components is also set up to send one, two or several time-controlled messages according to the communication schedule to one, two or several components of the second group of components, and wherein each of the computing nodes of the second group of components is also set up to react in one of the following ways upon receipt of a time-controlled message, for example depending on the received message, specifically depending on the content of the received message:

Reading out a current value/values of one local sensor/ of two or more /sensors;

Changing the state or the states of one or more local actors;

Executing an application-specific task;

Sending a new message, and/or each of the star couplers of the second group of components is also set up to react in one of the following ways upon receipt of a time-controlled message, for example depending on the received message, specifically depending on the content of the received message:

Sending a new message, or

Forwarding the received, time-controlled message, wherein the forwarding does not occur according to a communication schedule.

The aforementioned execution of an application-specific task deals with tasks, which transcend the receipt of the message, for example deals with the calculation of an actuating variable for a control loop.

The message, with which a component of the second group responds as described above as per the invention, can contain a sensor value, for example. In this case, it is useful if the message is transmitted quickly and with little transmission jitter, as will be discussed in greater detail below.

The message, with which a component of the second group responds as described above as per the invention, can also contain a diagnostic value, for example, such as the number of incorrectly received messages or information about the capacity of internal memories for example. Even in these cases, it may be advantageous if the message is transmitted quickly and with little transmission jitter, in order to execute a timely, system-wide recovery action, for example, such as a system restart.

The term connection (also referred to as a communication link, line or communication line) describes both wired and wireless connections. If it is important whether the connection is wired or wireless, this will be highlighted separately.

The reaction as per the invention of a computing node or star coupler as described above depends on the received time-controlled message or its contents. This means that a computing node or star coupler reacts differently depending on the received message, i.e. a viewed computing node/star coupler does not necessarily react to the receipt of a time-controlled message every time with precisely just one (consistent) reaction, but may also respond with another reaction each time. This depends on the time-controlled message every time.

Of course, it can also be intended that certain components (or all components) have precisely just one task, in this case such a component always reacts the same when receiving a corresponding time-controlled message.

As per the invention, such components can be used for the second group of components, which manage without a communication schedule. Such components are cost-effective, wherein the cost advantage for the components or the entire real-time system, inter alia, results from the following reasons:

(a) Computing nodes/star couplers of the second group must not synchronize their local clocks with one another or do not require a local clock at all or can make do with poor-quality quartz, (b) Computing nodes/star couplers of the second group must not store communication schedules locally, and (c) Existing computing nodes/star couplers can be used for the functions of the components of the second group without having to expand their functionality to include time-controlled communication.

In the prior art, however, all components work according to a communication schedule, so that in this case even those components which would correspond to the components of the second group in the present invention, would automatically execute the relevant activity according to their schedule, a request from the first group would not be necessary in this case. However, due to the reaction as per the invention of the computing nodes and/or star couplers of the second group, a communication schedule is not required for these components of the invention, so that the relevant cost saving occurs without the real-time behavior of the system deteriorating.

Preferred embodiments of the method as per the invention and of the computer network as per the invention, which may be realized alone or in any combination with one another, are described below:

It can be advantageous if one, two or more of the communication links, for example all communication links are wired. When applying the method according to the invention in a wired transmission method, multiple computing nodes can be controlled at the same time without a communication schedule using time-controlled messages.

Alternatively or additionally it can be intended that one, two or more of the communication links, for example all communication links are realized wirelessly. Preferably, the transmission times of the time-controlled messages in the communication schedule are selected in this context in such a way that the time-controlled messages are sent at the same time or only overlapping those wireless communication links, for which no interference of the message transmission exists.

When applying the method as per the invention in a (partly) wireless network, the communication schedule thus ensures that communication is only then carried out simultaneously on several wireless communication links if no disruptive influence occurs, e.g. if the wireless communication links are located far enough from one another, or if transmission is being carried out on different communication frequencies. The communication schedule also thereby stipulates the lines via which communication is taking place.

Due to the collision-prone nature of the wireless transmission medium, the deletion or delay of individual messages must regularly be accepted when trying to transmit several messages via different, closely adjacent wireless transmission routes. This destruction or delay of messages raises the question of the use of the wireless transmission medium for certain purposes in the field of "real-time control" and other purposes characterized by real-time requirements of communication.

Through the present advantageous embodiment/invention, the deletion and delay of messages on wireless transmission media can be largely avoided through coordinating measures and thus the use of this very transmission medium becomes advantageously possible for the aforementioned purposes as well. The appropriate coordination measures are designed accordingly so that the wireless message transmissions are arranged and carried out together in such a way that a collision of these messages among them is reliably avoided.

Advantageously, it can also be intended that two or more star couplers of the first group of components send and/or forward time-controlled messages to computing nodes at the same time or at overlapping times. For the designer of the distributed real-time system, this results in the freedom to connect computing nodes to different star couplers and still take advantage of the invention, if two or more star couplers send and/or forward synchronized messages.

It is preferably intended that the transmission of messages via wired communication links occurs according to an IEEE 802.3 Standard or a standard building upon this or subsequent to it.

It is preferably intended that the transmission of messages via wireless communication links occurs according to an IEEE 802.11 Standard or a standard building upon this or subsequent to it or according to an IEEE 802.15 Standard or a standard building upon this or subsequent to it.

It is preferably intended that one or more of the following standards or standards building upon it or subsequent to it will be used for time-controlled communication: SAE AS6802, IEEE 802.1Q, IEEE 802.1AS, IEEE 1588.

Furthermore, it may be advantageous if an upper limit is intended for the maximum permissible time interval between the time of reception of a time-controlled message with a component of the second group and the time point of the reaction of this component of the second group, specifically the transmission time of the transmission of a message of this component of the second group.

With the features as per the invention of claim 1, a minimal transmission jitter of the messages is achieved up to a component of the second group. By providing an upper limit, within which this component of the second group then reacts, a minimal transmission jitter is also minimized beyond this component of the second group.

The upper limit for components of the second group is constant in each case for a considered component, but can be different for different components. For example, the upper limit is calculated with the worst case execution time analysis.

It is preferably intended that each component of the second group reacts to messages in a constant time interval before reaching its upper limit, specifically sends messages, wherein the constant time interval preferably approaches zero.

A component without communication schedule can also be implemented in such a way that it sends its response frame (message) wherever possible at a time, which is as close as possible to the upper limit. If the components always send messages (i.e. constantly) as closely as possible to the upper limit, then the transmission jitter is minimized.

During implementation, it can also be intended for example that a component, such as a computing node, receives sensor values from the sensor just before reaching the upper limit, or the component is realized in such a way that the upper limit is innately small.

In the following, the invention discussed in more detail on the basis of the drawing using an exemplary realization. It can be seen that FIG. 1 shows an example of a network, in which computing nodes are connected with a star coupler using communication links, which are advantageously bidirectional communication links.

It is accepted that the exchange of information between components acts in a message-oriented manner, for example by means of Ethernet messages to wired connections and using 802.11 messages via wireless connections. In the following, more detail will not be given about the message format during the transmission of messages. Specifically, it shall not be addressed and for simplicity's sake it shall be assumed that—where this is intended—a conversion of message formats into standard-compliant formats (such as IEEE 802.3 and 802.11 or 802.15) shall be carried out for a transition between wired and wireless connections, as this is known from the prior art and this will not be described further here.

Figure 1:
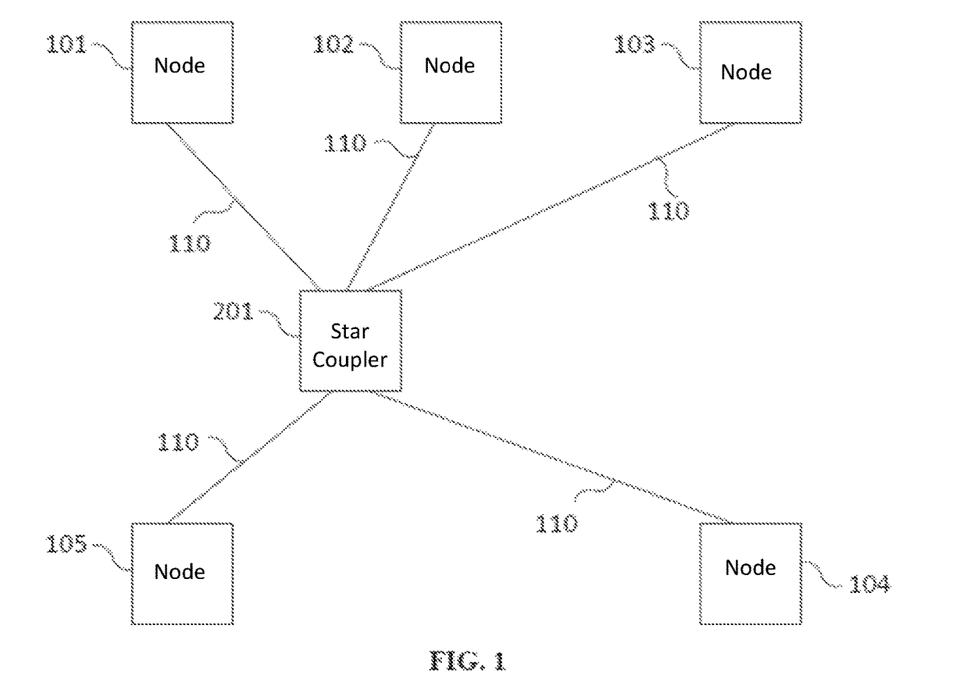

In FIG. 1, an example of a network is shown, in which computing nodes 101-105 are connected with a star coupler 201 using communication links 110, which are advantageously bidirectional communication links. The computing nodes 101-105 exchange messages with each other by sending these to the star coupler 201, and this forwards the messages to the appropriate recipient. Furthermore, a star coupler 201 can also generate messages itself and send these to computing nodes 101-105.

Figure 2:
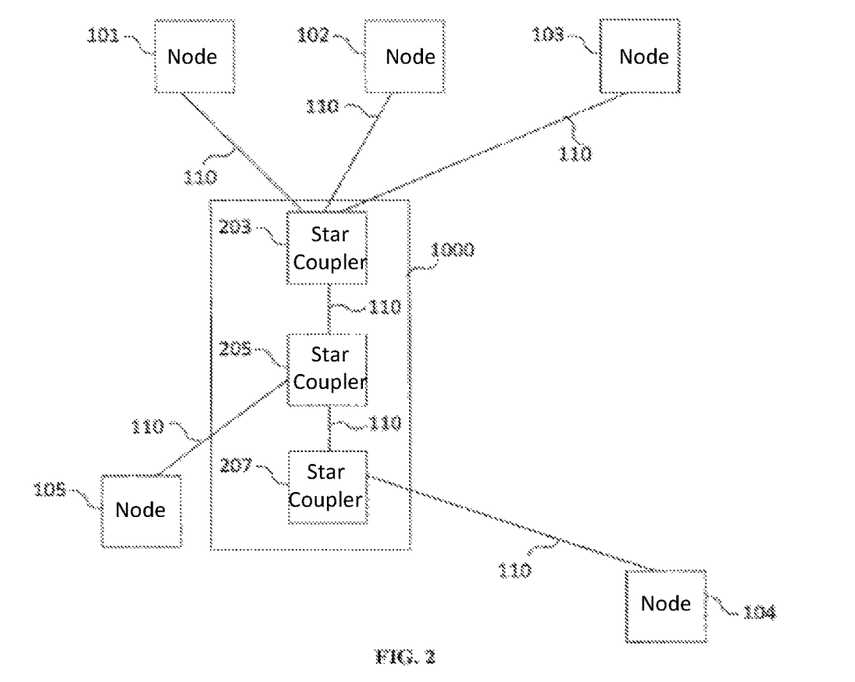
FIG. 2 shows several star couplers of a network, which are connected together and computing nodes of the network, which are each only connected with a subset of these star couplers.

FIG. 2 shows that several star couplers 203, 205, 207 of a network can also be connected together and computing nodes 101-105 of the network will be connected to only a subset of these star couplers 203, 205, 207. The communication between two computing nodes can then also occur via two or more star couplers 203, 205, 207. Such network structures are called multi-hop networks 1000. In the following description, multi-hop networks are not explicitly discussed, but it is the known prior art that an individual star coupler 201 (FIG. 1) can be replaced by a multi-hop network 1000 (FIG. 2).

Figure 3:
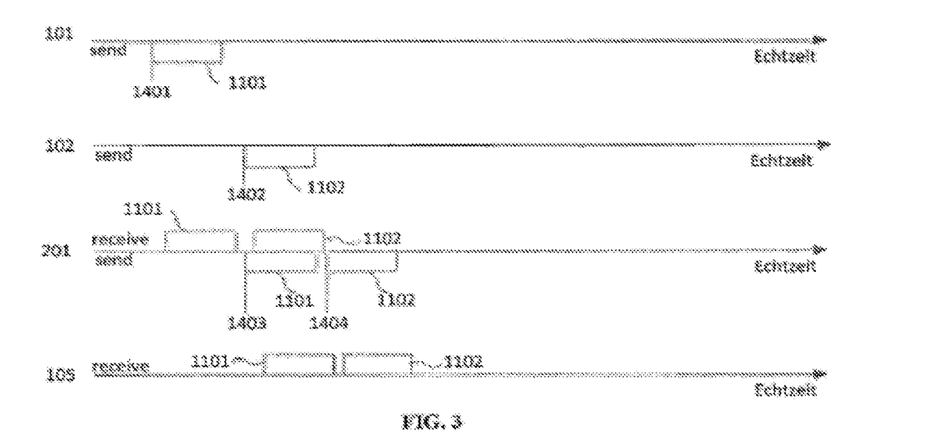
FIG. 3 shows an example for time-controlled communication based on a flow diagram.

In FIG. 3, an example of time-controlled communication is illustrated using a flow diagram. In this example, the computing nodes 101 and 102 as shown in FIG. 1, transmit time-controlled messages 1101 and 1102 via the star coupler 201 to the computing node 105. The special feature of a time-controlled communication is that the transmission times 1401, 1402 and/or the forwarding times 1403, 1404 of the time-controlled messages are already known before sending the message. The transmission times 1401, 1402 and/or the forwarding times 1403, 1404 can already be determined, for example, during the design of the distributed real-time system. The determination of the transmission times, forwarding times, reception times or a subset of these times is called the communication schedule. A synchronization of local clocks in the computing nodes and star couplers makes it possible for the communication schedule to be executed synchronously in the computing nodes and/or star couplers. To synchronize the local clocks, a clock synchronization protocol can be used, such as SAE AS6802, IEEE 1588, or IEEE 802.1AS.

Figure 4:
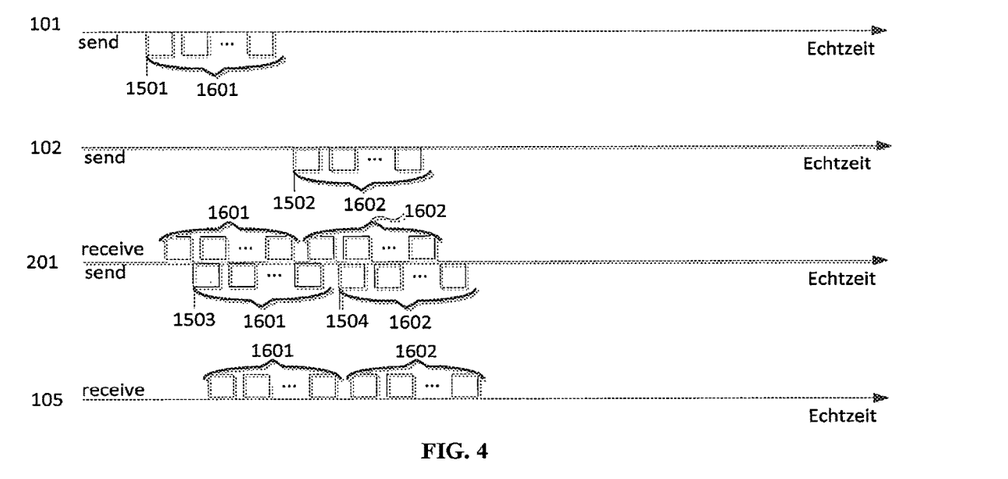
FIG. 4 shows a further example for time-controlled communication based on a flow diagram.

In FIG. 4, a further example is shown using a flow diagram, which illustrates time-controlled communication. Here, groups 1601, 1602 of time-controlled messages are each allocated to a transmission time 1501, 1502 and a forwarding time 1503, 1504. As shown in FIG. 4, the allocation of messages to the groups 1601, 1602 remains. This is however not necessarily the case, in this way the star coupler 201 could only implement the forwarding time 1503 and, if the forwarding time 1503 is reached, forward all messages of the group 1601 and 1602. Generally, the allocation of message to a group can be recreated arbitrarily per computing node and star coupler.

Figure 5:
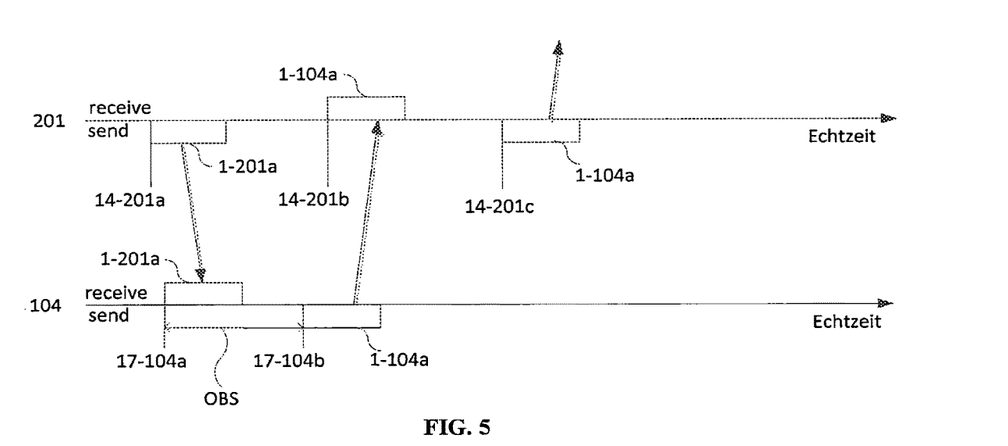
FIG. 5 shows an example of a deterministic communication as per the invention in a network from FIG. 1 based on a flow diagram.

In FIG. 5, an example of a deterministic communication as per the invention in a network from FIG. 1 is illustrated based on a flow diagram. In this example, it is assumed that the computing node 104 executes no communication schedule as per the invention, i.e. the computing node 104 sends no time-controlled messages. Instead, the computing node 104 reacts to the receipt of a message 1-201*a* in that the computing node 104 sends a message 1-104*a* as a response.

In this example, the message 1-201*a* is send in a time-controlled manner, i.e. the transmission time 14-201*a* is already known before sending the message, for example, already during the design of the distributed real-time system. The computing node 104 receives the message 1-201*a* at the time 17-104*a* and reacts to the receipt of the message 1-201*a* at the time 17-104*b* by sending its own message 1-104*a* to the star coupler 201. The star coupler receives the message 1-104*a* at the time 14-201*b*.

With known methods from the prior art, for example, the so-called worst-case execution time analysis (see, e.g., "The worst-case execution-time problem—overview of methods and survey of tools", Journal ACM Transactions on Embedded Computing Systems (TECS), Volume 7 Issue 3, April 2008), an upper limit OBS of the maximum time interval between the reception time 17-104*a* and the transmission time 17-104*b* in the computing node 104 can be determined. This upper limit OBS can be taken into account when creating the communication schedule. Thus, for example, the star coupler 201 can schedule the forwarding time 14-201*c*, at which the message 1-104*a* is forwarded into the network (e.g. to the computing node 101) as a time-controlled time, by taking into account during the creation of the communication schedule using the upper limit OBS where the message 1-104*a* can be located at the latest possible reception time 14-201*b*.

Figure 6:
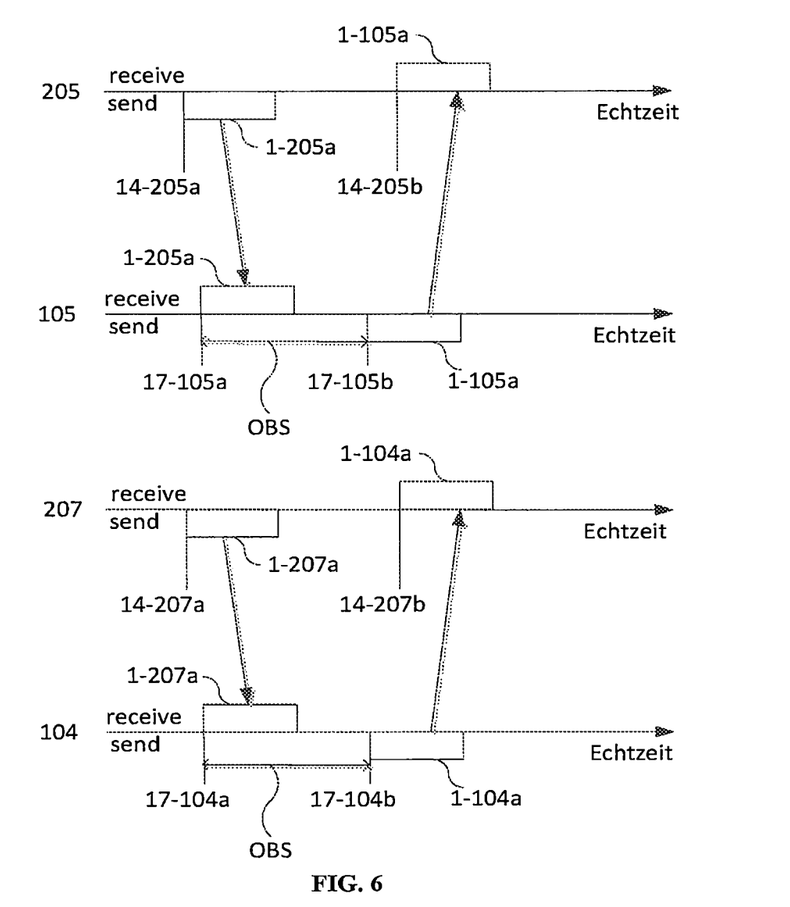
FIG. 6 shows an example of a deterministic communication as per the invention in a network from FIG. 2 based on a flow diagram.

In FIG. 6, an example of a deterministic communication as per the invention in a network from FIG. 2 is illustrated based on a flow diagram. In this example, it is assumed that the two computing nodes 104 and 105 execute no communication schedule, i.e. the computing nodes 104 and 105 send no time-controlled messages. Instead, the computing nodes 104 and 105 react to the receipt of a message 1-205*a* or 1-207*a* in that the computing nodes 104 and 105 each send a message 1-105*a* and 1-104*a* as a response. In the example in FIG. 6, it is assumed that the connection between computing node 105 and star coupler 205 is designed in such a way that a simultaneous time-controlled request by the star couplers 205 and 207 of computing nodes 104 and 105 is possible. This can then be achieved in particular if the connection between computing node 104 and star coupler 207 is realized as a wired connection.

Figure 6A:
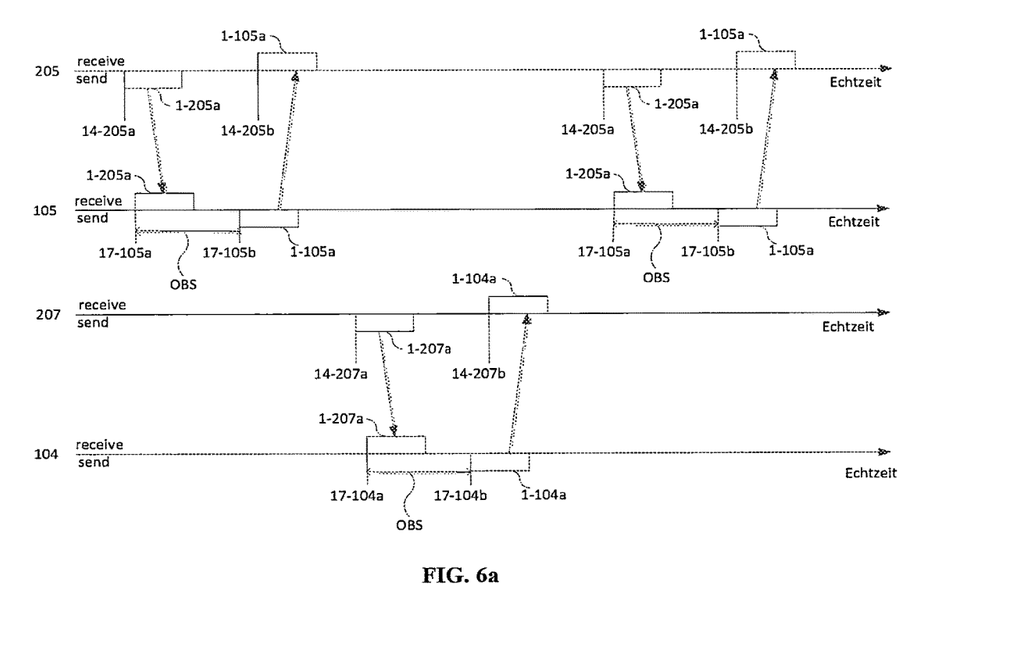
FIG. 6a shows another example of a deterministic communication as per the invention in a network from FIG. 2 based on a flow diagram.

In FIG. 6*a*, another example of a deterministic communication as per the invention in a network from FIG. 2 is illustrated based on a flow diagram. In this example, it is assumed that the computing nodes 104 and 105 execute no communication schedule, i.e. the computing nodes 104 and 105 send no time-controlled messages. Instead, the computing nodes 104 and 105 reacts to the receipt of a message 1-205*a* or 1-207*a* in that the computing node 104 and 105 each sends a message 1-104*a* and 1-105*a* as a response. In this example, it is assumed that the simultaneous transmissions to the lines 110 between the star couplers 205 and 207 and the computing nodes 105 and 104 would be disrupted. This is particularly the case if—as assumed in this example—the connection between computing node 105 and star coupler 205 and the connection between computing node 104 and star coupler 207 is realized as a wireless connection. To avoid such interference, the communication schedule is designed such that no simultaneous communication occurs, namely in that as shown the star coupler 205 and 207 send their time-controlled messages 1-205*a* and 1-207*a* with enough time between them that only ever one transmission of one of the messages 14-205*a* and 14-207*a* and response messages 1-104*a*, 1-105*a* takes place at each time.

Figure 7:
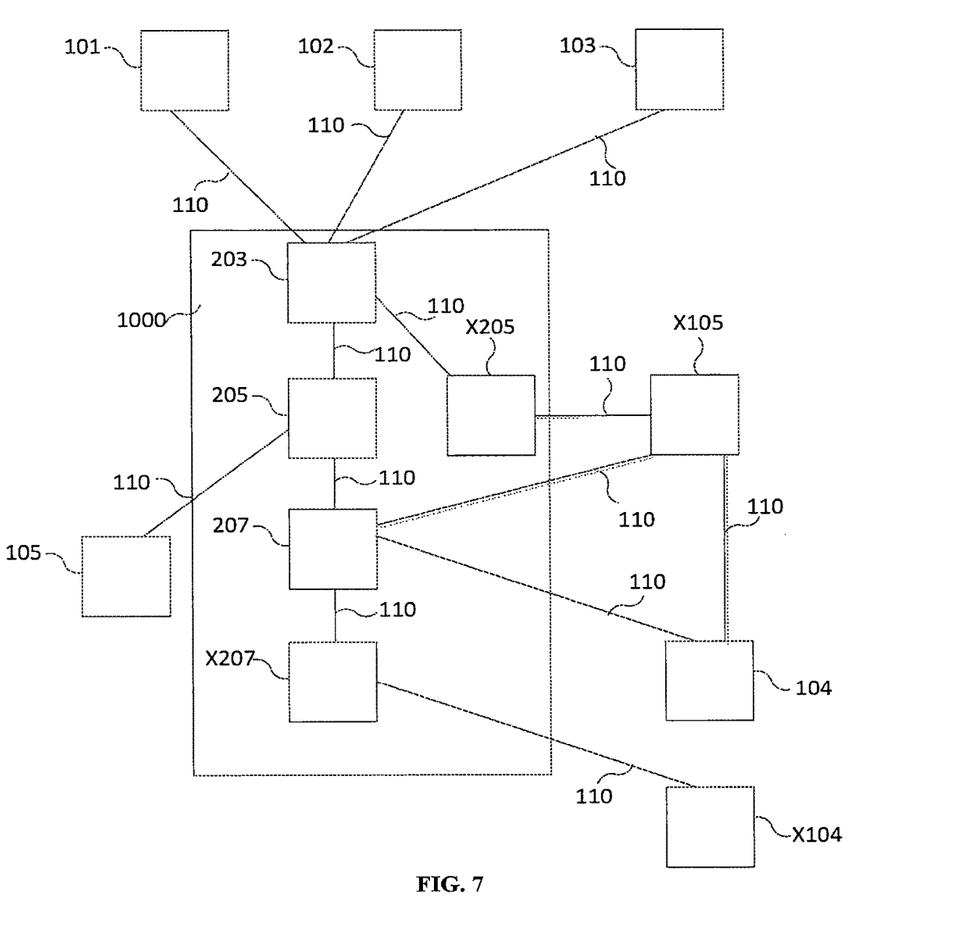
FIG. 7 shows an example of a network, in which computing nodes are connected with star couplers using communication links, advantageously bidirectional communication links.

In FIG. 7, an example of a network is shown, in which computing nodes 101-105, X104, X105 are connected with star couplers 203, 205, 207, X205, X207 using communication links 110, advantageously bidirectional communication links 110. The computing nodes 101-105, X104, X105 exchange messages with each other by sending these to the star couplers 203, 205, 207, X205, X207 and this forwards the messages to the appropriate recipient and/or other star couplers 203, 205, 207, X205, X207. Furthermore, a star coupler 203, 205, 207, X205, X207 can also generate messages itself and send these to computing nodes 101-105, X104, X105.

Figure 8:
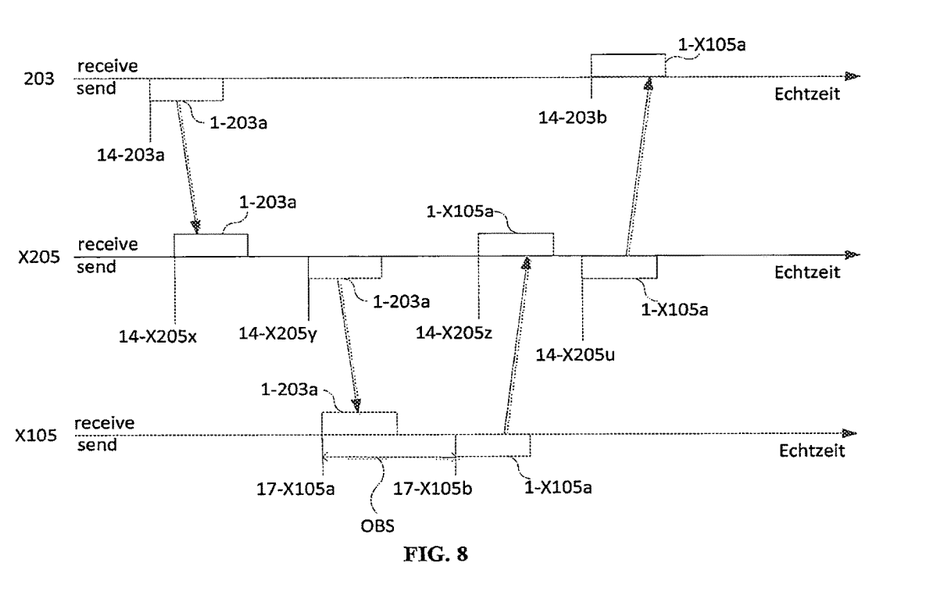
FIG. 8 shows an example of deterministic communication in a network from FIG. 7 based on a flow diagram.

In FIG. 8, an example of deterministic communication in a network as in FIG. 7 is shown based on a flow diagram. In this example, it is assumed that the computing node X105 and star coupler X205 execute no communication schedule, i.e. the computing node X105 sends no time-controlled messages and star coupler X205 does not forward messages according to a communication schedule. Instead, the computing node X105 reacts to the receipt of a message 1-203a in that the computing node X105 sends a message 1-X105a as a response. Star coupler X205 forwards the time-controlled message 1-203a according to a non-time-controlled principle, for example according to the First-In First-Out (FIFO) principle.

Generally in the present invention, it applies that a transmission considered as per the invention always starts with a time-controlled transmission, i.e. with a transmission according to a communication schedule, then any arbitrary sequence of transmissions can follow the same message according to a communication schedule or not according to a communication schedule (e.g. according to the First-Come First-Served strategy).

The example starts with a star coupler 203, which sends a time-controlled message 1-203a at the time 14-203a to the star coupler X205. Star coupler X205 receives the message 1-203a at the time 14-X205x and forwards the message 1-203a at the time 14-X205y to the computing node X105, wherein the forwarding time 14-X205y is not recorded in the communication schedule, so results dynamically. Computing node X105 receives the message 1-203a at the time 17-X105a. Computing node X105 reacts to the receipt of the message 1-203a by sending a new message 1-X105a to the star coupler X205 at the time 17-X105b. Star coupler X205 receives the message 1-X105a at the time 14-X205z and forwards it at the time 14-X205u to the star coupler 203, which receives the message at the time 14-203b.

The example in FIG. 8 shows that (in contrast to the example in FIG. 5) the last transmission of the message to a computing node, in this example computing node X105, does not necessarily have to be time-controlled in order to facilitate a deterministic communication. As the message 1-203a was originally sent from star coupler 203 as a time-controlled message, the determinism feature can be preserved transitively if the communication schedule is created. I.e. the message 1-203a can be sent from star coupler X205 as a non-time-controlled message to computing node X105 as long as an upper limit for the maximum temporal delay of the message 1-203a in the star coupler X205 is known at the time of the creation of the communication schedule. Such a delay can be calculated using methods from the prior art, such as the Worst-Case Execution-Time analysis.

"Determinism" refers to a temporally predictable behavior with only small errors. Temporally predictable means that the communication is optimized to the effect that the transmission jitter, that is the difference between the longest possible and shortest possible transmission duration of a message, is minimized. Typical values for the transmission jitter are in the range of single digit microseconds and below, stated purely as an example.

Preserved transitively means that the good quality of the transmission jitter, which is achieved by the time-controlled, even with communication as per the invention, which is partly not time-controlled, is preserved.

Figure 8A:
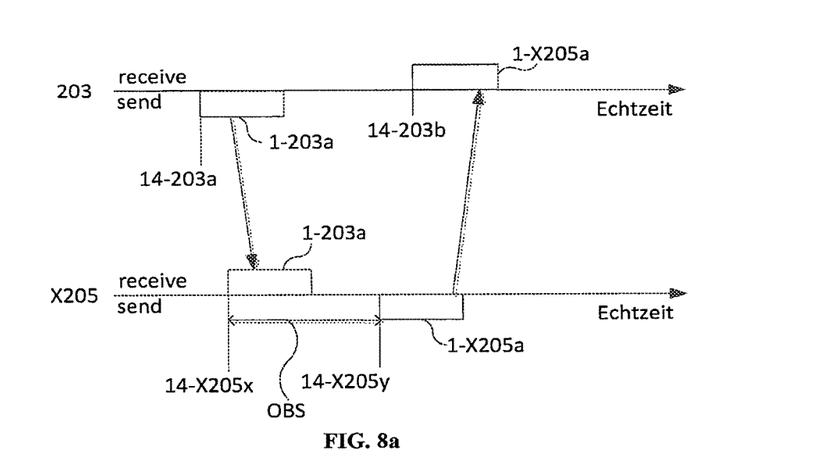
FIG. 8a shows another example of deterministic communication in a network from FIG. 7 based on a flow diagram.

In FIG. 8a, a further example of deterministic communication in a network as in FIG. 7 is shown based on a flow diagram. In this example, it is assumed that the star coupler X205 executes no communication schedule, i.e. the star coupler X205 sends no time-controlled messages. Instead, the star coupler X205 reacts to the receipt of a message 1-203a in that the star coupler X205 sends a message 1-X205a as a response.

Figure 8B:
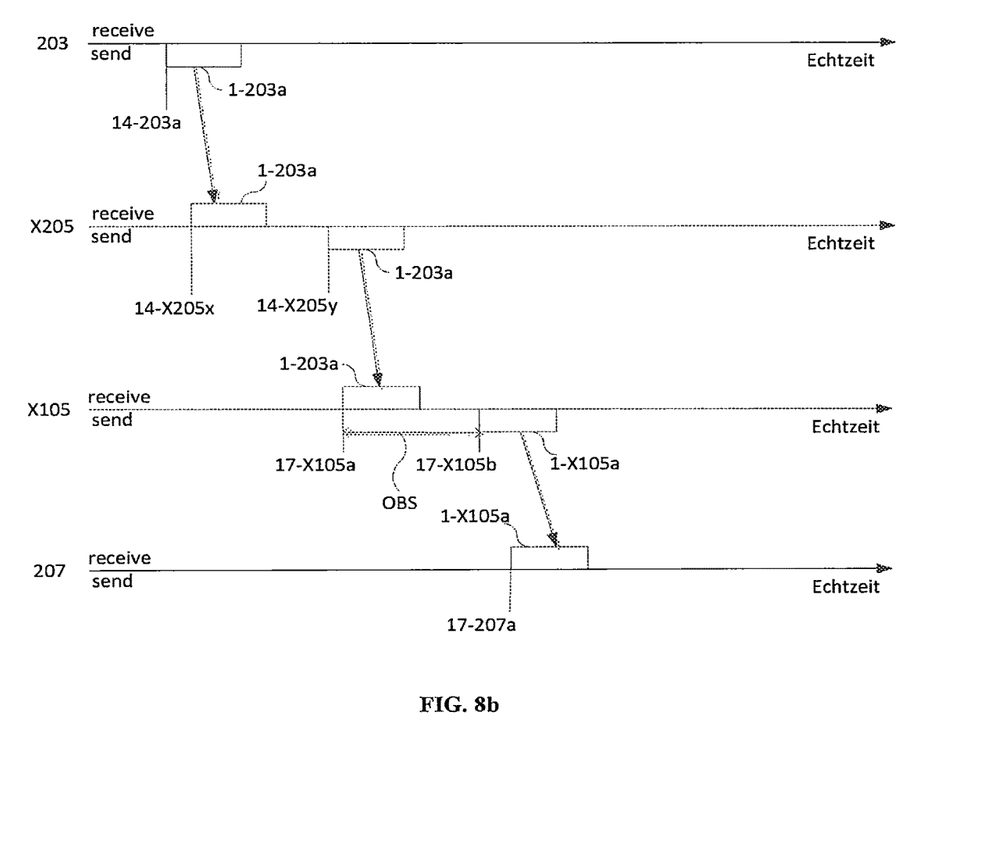
FIG. 8b shows a further example of deterministic communication in a network from FIG. 7 based on a flow diagram.

In FIG. 8b, another further example of deterministic communication in a network as in FIG. 7 is shown based on a flow diagram. The example is very similar to the example in FIG. 8, with the difference that computing node X105 does not send the response message 1-X105a to the star coupler X205, but rather to another star coupler or computing node, in this example star coupler 207. The information, to which star coupler and/or which computing node a star coupler and/or computing node should send the response message 1-X105a without communication schedule can be configured offline or can be part of the message 1-203a, which leads to the response message 1-X105a.

Figure 9:
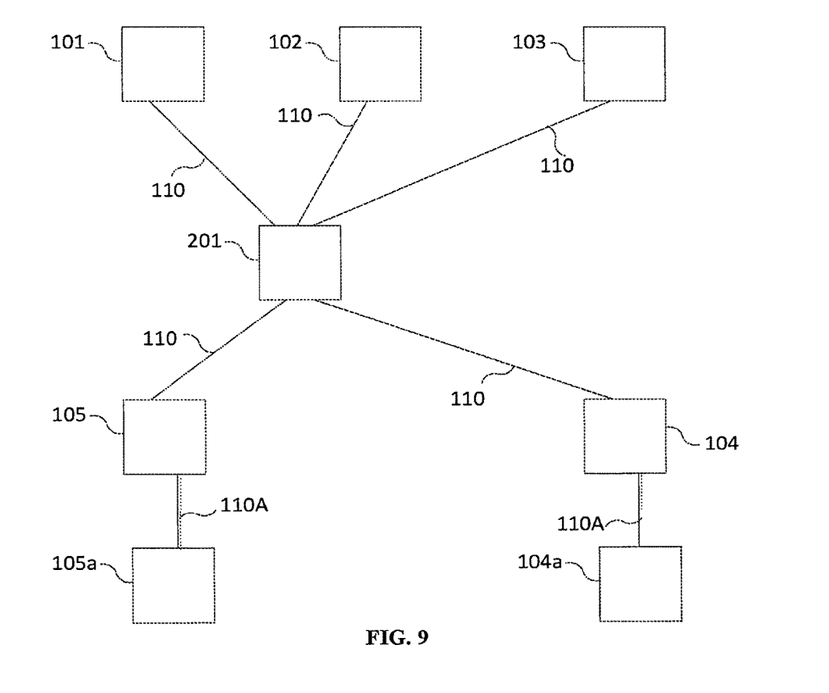
FIG. 9 shows a network as per FIG. 1, with additionally a sensor and an actuator.

In FIG. 9, a network as per FIG. 1 is shown. Beyond this, a sensor 104a and an actuator 105a are also shown in FIG. 9, which are each connected via local communication lines 110A with the computing nodes 104 and 105, respectively. In such a distributed real-time system, the receipt of a time-controlled message 1-201a from the star coupler 201 into the computing node 104 can cause the computing node 104 to read the current value of the sensor 104a. Similarly, the receipt of a time-controlled message 1-201a from the star coupler 201 into the computing node 105 can cause the computing node 105 to change the status of the actuator 105a.

Figure 10:
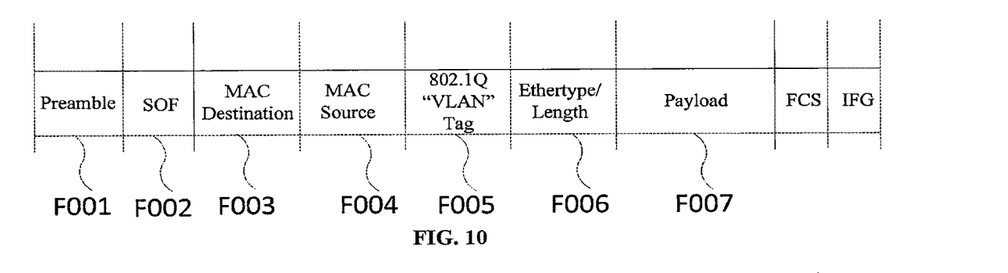
FIG. 10 shows the Ethernet message format as an example for messages, which are communicated in a distributed real-time system via wired connections.

In FIG. 10, the Ethernet message format is shown as an example for messages, which can be communicated in a distributed real-time system via wired connections. As shown, the Ethernet message format consists of various fields F001-F007, FCS, IFG. A computing node 104, 105, X104, X105 and/or star coupler X204, X205 can each without communication schedule recognize on the basis of one or more of the fields F001-F007 in a received message (the FCS, IFG fields are not important) that a response should be given to the received message, for example, by sending a new message as a response, and/or
   by reading out a local sensor, and/or
   by triggering a local actuator, and/or
   by executing an application, and/or
   by forwarding the message not according to a communication schedule.

Figure 11:
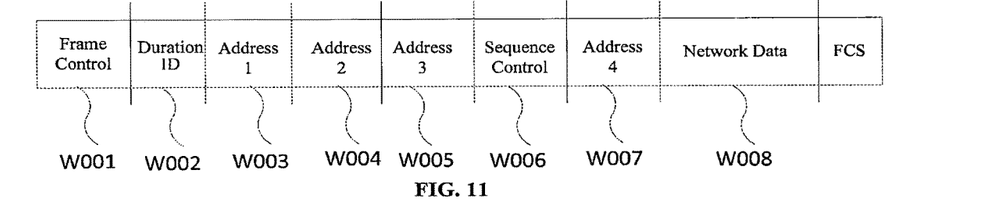
FIG. 11 shows the message format of the IEEE 802.11 Standard as an example for messages, which are communicated in a distributed real-time system via wireless connections.

In FIG. 11, the message format of the IEEE 802.11 Standard is shown as an example for messages, which can be communicated in a distributed real-time system via wireless connections. As shown, the message format consists of various fields W001-W008, FCS. A computing node 104, 105, X104, X105 and/or star coupler X204, X205 can each without communication schedule recognize on the basis of one or more of the fields W001-W008 in a received message that a response should be given to the received message, for example, by sending a new message as a response, and/or
   by reading out a local sensor, and/or
   by triggering a local actuator, and/or
   by executing an application, and/or
   by forwarding the message not according to a communication schedule.

For example, it may be intended that the content of the aforementioned field or fields or generally the content of one or more fields of a message, whose fields or whose content is/are relevant for the reaction of a received component, is configured at the time of the configuration of the network, i.e. specifically before the network executes its planned purpose, and is, for example, saved in the relevant components.

The invention claimed is:

1. A method for transmitting messages in a computer network, wherein the computer network comprises computing nodes (101-105, X104, X105) connected with each other via at least one star coupler (201, 203, 205, 207, X204, X205) and/or at least one multi-hop network (1000), wherein each computing node (101-105, X104, X105) is connected via at least one communication link (110) with the at least one star coupler (201, 203, 205, 207, X204, X205) and/or the at least one multi-hop (1000) network, and wherein the computing nodes (101-105, X104, X105) exchange messages with one another and with the at least one star coupler (201, 203, 205, 207, X204, X205) and/or the at least one multi-hop network (1000),the method comprising:
providing a first group of components, wherein the components of the first group send and forward and receive time-controlled messages according to a communication schedule, wherein the first group of components comprises one, two or several components, and wherein each component of the first group is either a computing node (101, 102, 103), a star coupler (201, 203, 205, 207) or a star coupler of a multi-hop network,
providing a second group of components, wherein the components of the second group do not send and forward and receive time-controlled messages according to a communication schedule, wherein the second group of components comprises one, two or several components, and wherein each component of the first group is either a computing node (104, 105, X104, X105), a star coupler (X204, X205) or a star coupler of a multi-hop network,
sending, by at least one component (101, 102, 103, 201, 203, 205, 207) of the first group of components, one, two or several time-controlled messages according to the communication schedule to one, two or several components (104, 105, X104, X105, X204, X205) of the second group of components,
reacting, by each of the computing nodes (104, 105, X104, X105) of the second group of components, in one of the following ways upon receipt of a time-controlled message:
reading out a current value of at least one local sensor;
changing a state of one or more local actors;
executing an application-specific task;
sending a new message (1-104a, 1-105a, 1-X105a), and
reacting, by each of the star couplers (X204, X205) of the second group of components, in one of the following ways upon receipt of a time-controlled message:
sending a new message (1-X205a), or
forwarding the received, time-controlled message, wherein the forwarding does not occur according to a communication schedule,
wherein an upper limit (OBS) is configured for a maximum permissible time interval between the time of reception (17-104a) of a time-controlled message with a component of the second group and the time point of the reaction of this component of the second group, specifically the transmission time (17-104b) of the transmission of a message of this component of the second group, and
wherein each component of the second group is configured to react to messages in a constant time interval before reaching its upper limit (OBS), specifically to send messages, wherein the constant time interval approaches zero.

2. The method of claim 1, wherein one, two or more of the communication links (110), or all communication links, are wired.

3. The method of claim 1, wherein one, two or more of the communication links (110), or all communication links, are wireless.

4. The method of claim 3, wherein transmission times of the time-controlled messages in the communication schedule are selected in this context in such a way that the time-controlled messages are sent at the same time or only overlapping those wireless communication links, for which no interference of the message transmission exists.

5. The method of claim 1, wherein two or more star couplers of the first group of components send and forward time-controlled messages to computing nodes at the same time or at overlapping times.

6. The method of claim 2, wherein the transmission of messages via wired communication links is based on an IEEE 802.3 Standard or a standard building upon this or subsequent to it.

7. The method of claim 2, wherein the transmission of messages via wireless communication links is based on an IEEE 802.11 Standard or a standard building upon this or subsequent to it or based on an IEEE 802.15 Standard or a standard building upon this or subsequent to it.

8. The method of claim 1, wherein one or more of the following standards or standards building upon it or subsequent to it will be used for time-controlled communication: SAE AS6802, IEEE 802.1Q, IEEE 802.1AS, and IEEE 1588.

9. A computer network for transmitting messages, wherein the computer network comprises computing nodes (101-105, X104, X105) connected with each other via at least one star coupler (201, 203, 205, 207, X204, X205) and/or at least one multi-hop network (1000), wherein each computing node (101-105, X104, X105) is connected via at least one communication link (110) with the at least one star coupler (201, 203, 205, 207, X204, X205) and/or the at least one multi-hop (1000) network, and wherein the computing nodes (101-105, X104, X105) exchange messages with one another and with the at least one star coupler (201, 203, 205, 207, X204, X205) and/or the at least one multi-hop network (1000), the computer network comprising:
a first group of components, wherein the components of the first group are also set up to send and to forward and to receive time-controlled messages according to a communication schedule, wherein the first group of components comprises one, two or several component(s), and wherein each component of the first group is either a computing node (101, 102, 103), a star coupler (201, 203, 205, 207) or a star coupler of a multi-hop network,
a second group of components, wherein the components of the second group are not also set up to send and to forward and to receive time-controlled messages according to a communication schedule, wherein the second group of components comprises one, two or several component(s), and wherein each component of the first group is either a computing node (104, 105, X104, X105), a star coupler (X204, X205) or a star coupler of a multi-hop network,
at least one component (101, 102, 103, 201, 203, 205, 207) of the first group of components is also set up to send one, two or several time-controlled messages according to the communication schedule to one, two or several components (104, 105, X104, X105, X204, X205) of the second group of components, each of the computing nodes (104, 105, X104, X105) of the second group of components is also set up to react in one of the following ways upon receipt of a time-controlled message:
  read out a current value of at least one local sensor;
  change a state of one or more local actors;
  execute an application-specific task;
  send a new message (1-104a, 1-105a, 1-X105a),
and
each of the star couplers (X204, X205) of the second group of components is also set up to react in one of the following ways upon receipt of a time-controlled message:
  send a new message (1-X205a), or
  forward the received, time-controlled message, wherein the forwarding does not occur according to a communication schedule,
wherein an upper limit (OBS) is configured for a maximum permissible time interval between the time of reception (17-104a) of a time-controlled message with a component of the second group and the time point of the reaction of this component of the second group, specifically the transmission time (17-104b) of the transmission of a message of this component of the second group, and
wherein each component of the second group is configured to react to messages in a constant time interval before reaching its upper limit (OBS), specifically to send messages, wherein the constant time interval approaches zero.

10. The computer network of claim 9, wherein one, two or more of the communication links (110), or all communication links, are wired.

11. The computer network of claim 9, wherein one, two or more of the communication links (110), or all communication links, are wireless.

12. The computer network of claim 11, wherein transmission times of the time-controlled messages in the communication schedule are selected in this context in such a way that the time-controlled messages are sent at the same time or only overlapping those wireless communication links, for which no interference of the message transmission exists.

13. The computer network of claim 9, wherein two or more star couplers of the first group of components send and forward time-controlled messages to computing nodes at the same time or at overlapping times.

14. The computer network of claim 10, wherein the transmission of messages via wired communication links is based on an IEEE 802.3 Standard or a standard building upon this or subsequent to it.

15. The computer network of claim 10, wherein the transmission of messages via wireless communication links is based on an IEEE 802.11 Standard or a standard building upon this or subsequent to it or based on an IEEE 802.15 Standard or a standard building upon this or subsequent to it.

16. The computer network of claim 9, wherein one or more of the following standards or standards building upon it or subsequent to it will be used for time-controlled communication: SAE AS6802, IEEE 802.1Q, IEEE 802.1AS, and IEEE 1588.

17. A method for transmitting messages in a computer network, wherein the computer network comprises computing nodes (101-105, X104, X105) connected with each other via at least one star coupler (201, 203, 205, 207, X204, X205) and/or at least one multi-hop network (1000), wherein each computing node (101-105, X104, X105) is connected via at least one communication link (110) with the at least one star coupler (201, 203, 205, 207, X204, X205) and/or the at least one multi-hop (1000) network, and wherein the computing nodes (101-105, X104, X105) exchange messages with one another and with the at least one star coupler (201, 203, 205, 207, X204, X205) and/or the at least one multi-hop network (1000),the method comprising:
  providing a first group of components, wherein the components of the first group send and forward and receive time-controlled messages according to a communication schedule, wherein the first group of components comprises one, two or several components, and wherein each component of the first group is either a computing node (101, 102, 103), a star coupler (201, 203, 205, 207) or a star coupler of a multi-hop network,
  providing a second group of components, wherein the components of the second group do not send and forward and receive time-controlled messages according to a communication schedule, wherein the second group of components comprises one, two or several components, and wherein each component of the first group is either a computing node (104, 105, X104, X105), a star coupler (X204, X205) or a star coupler of a multi-hop network,
  sending, by at least one component (101, 102, 103, 201, 203, 205, 207) of the first group of components, one, two or several time-controlled messages according to the communication schedule to one, two or several components (104, 105, X104, X105, X204, X205) of the second group of components,
  reacting, by each of the computing nodes (104, 105, X104, X105) of the second group of components, in one of the following ways upon receipt of a time-controlled message:
    reading out a current value of at least one local sensor;
    changing a state of one or more local actors;
    executing an application-specific task;
    sending a new message (1-104a, 1-105a, 1-X105a),
  and
  reacting, by each of the star couplers (X204, X205) of the second group of components, in one of the following ways upon receipt of a time-controlled message:
    sending a new message (1-X205a), or
    forwarding the received, time-controlled message, wherein the forwarding does not occur according to a communication schedule,
  wherein an upper limit (OBS) is configured for a maximum permissible time interval between the time of reception (17-104a) of a time-controlled message with a component of the second group and the time point of the reaction of this component of the second group, specifically the transmission time (17-104b) of the transmission of a message of this component of the second group, and
  wherein the upper limit (OBS) is calculated with the worst case execution time analysis.

18. A computer network for transmitting messages, wherein the computer network comprises computing nodes (101-105, X104, X105) connected with each other via at least one star coupler (201, 203, 205, 207, X204, X205) and/or at least one multi-hop network (1000), wherein each computing node (101-105, X104, X105) is connected via at least one communication link (110) with the at least one star coupler (201, 203, 205, 207, X204, X205) and/or the at least one multi-hop (1000) network, and wherein the computing nodes (101-105, X104, X105) exchange messages with one another and with the at least one star coupler (201, 203, 205, 207, X204, X205) and/or the at least one multi-hop network (1000), the computer network comprising:
- a first group of components, wherein the components of the first group are also set up to send and to forward and to receive time-controlled messages according to a communication schedule, wherein the first group of components comprises one, two or several component(s), and wherein each component of the first group is either a computing node (101, 102, 103), a star coupler (201, 203, 205, 207) or a star coupler of a multi-hop network,
- a second group of components, wherein the components of the second group are not also set up to send and to forward and to receive time-controlled messages according to a communication schedule, wherein the second group of components comprises one, two or several component(s), and wherein each component of the first group is either a computing node (104, 105, X104, X105), a star coupler (X204, X205) or a star coupler of a multi-hop network,
- at least one component (101, 102, 103, 201, 203, 205, 207) of the first group of components is also set up to send one, two or several time-controlled messages according to the communication schedule to one, two or several components (104, 105, X104, X105, X204, X205) of the second group of components, each of the computing nodes (104, 105, X104, X105) of the second group of components is also set up to react in one of the following ways upon receipt of a time-controlled message:
- read out a current value of at least one local sensor;
- change a state of one or more local actors;
- execute an application-specific task;
- send a new message (1-104a, 1-105a, 1-X105a), and
each of the star couplers (X204, X205) of the second group of components is also set up to react in one of the following ways upon receipt of a time-controlled message:
- send a new message (1-X205a), or
- forward the received, time-controlled message, wherein the forwarding does not occur according to a communication schedule, wherein an upper limit (OBS) is configured for a maximum permissible time interval between the time of reception (17-104a) of a time-controlled message with a component of the second group and the time point of the reaction of this component of the second group, specifically the transmission time (17-104b) of the transmission of a message of this component of the second group, and wherein the upper limit (OBS) is calculated with the worst case execution time analysis.

* * * * *